United States Patent
Yamamoto et al.

(10) Patent No.: US 11,936,265 B2
(45) Date of Patent: Mar. 19, 2024

(54) ROTATING ELECTRICAL MACHINE

(71) Applicant: Mitsubishi Electric Corporation, Tokyo (JP)

(72) Inventors: Takashi Yamamoto, Tokyo (JP); Akira Kimishima, Tokyo (JP); Toshihiro Matsunaga, Tokyo (JP); Kengo Fujimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 614 days.

(21) Appl. No.: 17/254,602

(22) PCT Filed: Aug. 17, 2018

(86) PCT No.: PCT/JP2018/030516
§ 371 (c)(1),
(2) Date: Dec. 21, 2020

(87) PCT Pub. No.: WO2020/035939
PCT Pub. Date: Feb. 20, 2020

(65) Prior Publication Data
US 2021/0281137 A1 Sep. 9, 2021

(51) Int. Cl.
*H02K 3/50* (2006.01)
*H02K 3/32* (2006.01)
(Continued)

(52) U.S. Cl.
CPC ............. *H02K 3/50* (2013.01); *H02K 3/325* (2013.01); *H02K 3/52* (2013.01); *H02K 3/522* (2013.01);
(Continued)

(58) Field of Classification Search
CPC .......... H02K 3/50; H02K 3/325; H02K 3/522; H02K 2203/09; H02K 2213/03;
(Continued)

(56) References Cited

U.S. PATENT DOCUMENTS 9,685,844 B2 * 6/2017 Nakamura ............. H02K 3/522
2003/0201688 A1 * 10/2003 Yamamura ............. H02K 3/522
310/71
(Continued)

FOREIGN PATENT DOCUMENTS

DE   11 2016 003 648 T5   5/2018
JP   2005-160137 A   6/2005
(Continued)

OTHER PUBLICATIONS

JP 2005160137 A (Year: 2005).*
(Continued)

*Primary Examiner* — Alexander A Singh
(74) *Attorney, Agent, or Firm* — Sughrue Mion, PLLC; Richard C. Turner

(57) ABSTRACT

A rotating electrical machine includes an annular coil connection body provided coaxially with a stator. The coil connection body has, in a groove provided on a holder, an overhang portion for restricting an axial-direction movement of a terminal, and a positioning projection for restricting a radial-direction movement of the terminal. The positioning projection positions the terminal such that a part of the terminal overlaps the overhang portion in the axial direction. In this structure, when the terminal moves in a direction from a terminal holding portion toward a groove opening, the terminal comes into contact with a side surface of the overhang portion, whereby lifting and coming-off of the terminal can be prevented.

18 Claims, 7 Drawing Sheets

(51) Int. Cl.
  *H02K 3/52* (2006.01)
  *H02K 5/22* (2006.01)
(52) U.S. Cl.
  CPC ......... *H02K 5/225* (2013.01); *H02K 2203/09* (2013.01)
(58) Field of Classification Search
  CPC ........... H02K 5/225; H02K 3/52; H02K 3/38; H02K 3/46
  USPC .......................................................... 310/71
  See application file for complete search history.

(56) References Cited

U.S. PATENT DOCUMENTS

| | | | |
|---|---|---|---|
| 2007/0278876 A1* | 12/2007 | Haga | H02K 3/325 310/260 |
| 2010/0148615 A1* | 6/2010 | Sasaki | H02K 3/522 310/180 |
| 2012/0235524 A1 | 9/2012 | Sasaki et al. | |
| 2014/0021815 A1* | 1/2014 | Tomita | H02K 3/50 310/71 |
| 2014/0028130 A1* | 1/2014 | Sonoda | H02K 15/02 310/71 |
| 2014/0292124 A1 | 10/2014 | Nakamura et al. | |
| 2018/0241272 A1* | 8/2018 | Asahi | H02K 15/0068 |

FOREIGN PATENT DOCUMENTS

| | | |
|---|---|---|
| JP | 2005-304278 A | 10/2005 |
| JP | 4007176 B2 | 11/2007 |
| JP | 2008-301561 A | 12/2008 |
| JP | 2010-11690 A | 1/2010 |
| JP | 2010-63273 A | 3/2010 |

OTHER PUBLICATIONS

JP 2010063273 A (Year: 2010).*
JP 4007176 B2 (Year: 2007).*
JP 2005304278 A (Year: 2005).*
Extended European Search Report dated Jul. 12, 2021, issued by the European Patent Office in application No. 18930497.5.
Notice of Reasons for Refusal dated Jan. 11, 2022 from the Japanese Patent Office in Japanese Application No. 2020-537342.
International Search Report for PCT/JP2018/030516 dated Nov. 13, 2018 (PCT/ISA/210).

* cited by examiner

ROTATING ELECTRICAL MACHINE

CROSS REFERENCE TO RELATED APPLICATIONS

This application is a National Stage of International Application No. PCT/JP2018/030516 filed Aug. 17, 2018.

TECHNICAL FIELD

The present disclosure relates to a rotating electrical machine including a coil connection body.

BACKGROUND ART

As a coil connection body of a rotating electrical machine, there is a structure in which arc-shaped conductive members are provided in a plurality of grooves formed concentrically in a holder which is an insulating member made of resin. The conductive member provided at a predetermined position in the groove of the holder is connected to an end of a coil wound around a tooth of a stator and is subjected to predetermined wire connection. In a conventional coil connection body, the conductive member once inserted in the groove is lifted by impact during conveyance, an external load during assembly, or the like, thus leading to deterioration of productivity in the later process of connecting the conductive member and an end of a coil, reduction of insulation property between the conductive members, and the like. In particular, in the case of the conductive member that is small in the length dimension in the circumferential direction of the arc part, a fitting part thereof to the holder is short, and thus the conductive member readily comes off.

Meanwhile, in the case of strictly setting the dimensional tolerance between the groove and the conductive member in order to prevent the conductive member from coming off, if the conductive member or the groove is deformed, it becomes difficult to fit the conductive member, so that assemblability is reduced. In order to solve such a problem, in Patent Document 1, the groove is formed to be wider than the conductive member, and a projection to contact with the conductive member is provided in the groove, whereby the conductive member is inhibited from moving in the groove or coming off from the groove.

CITATION LIST

Patent Document

Patent Document 1: Japanese Laid-Open Patent Publication No. 2005-304278

SUMMARY OF THE INVENTION

Problems to be Solved by the Invention

However, in the configuration in which contact with the conductive member is ensured by the projection provided in the groove to prevent lifting of the conductive member as in Patent Document 1, if the width dimension of the groove becomes smaller than a design value due to deformation of the holder or the like, a load in attachment work for press-fitting the conductive member into the holder increases, thus deteriorating assemblability. On the other hand, if the width dimension of the groove becomes greater than the design value due to deformation of the holder or the like, contact between the projection and the conductive member cannot be ensured, and therefore lifting of the conductive member cannot be inhibited.

The present disclosure has been made to solve the above problems, and an object of the present disclosure is to provide a rotating electrical machine in which lifting and coming-off of a conductive member held by a holder of a coil connection body are inhibited, thus achieving high assemblability and high insulation property.

Solution to the Problems

A rotating electrical machine according to the present disclosure is a rotating electrical machine including an annular coil connection body provided coaxially with a stator, wherein the coil connection body includes an insulating holder made of resin and having a plurality of grooves provided coaxially, and a conductive member held in the groove and connected to an end of a coil wound around a tooth of the stator, each groove has an overhang portion provided at a groove opening side relative to the conductive member on one side wall and restricting an axial-direction movement of the conductive member, and a positioning projection provided at a position opposed in a radial direction to the conductive member on another side wall, and restricting a radial-direction movement of the conductive member.

Effect of the Invention

In the rotating electrical machine according to the present disclosure, the overhang portion for restricting an axial-direction movement of the conductive member and the positioning projection for restricting a radial-direction movement of the conductive member are provided in the groove provided on the insulating holder of the coil connection body. Thus, with a simple structure, lifting and coming-off of the conductive member can be inhibited, whereby assemblability and insulation property can be improved.

Objects, features, aspects, and effects of the present disclosure other than the above will become more apparent from the following detailed description with reference to the drawings.

DESCRIPTION OF EMBODIMENTS

Embodiment 1

Figure 1:
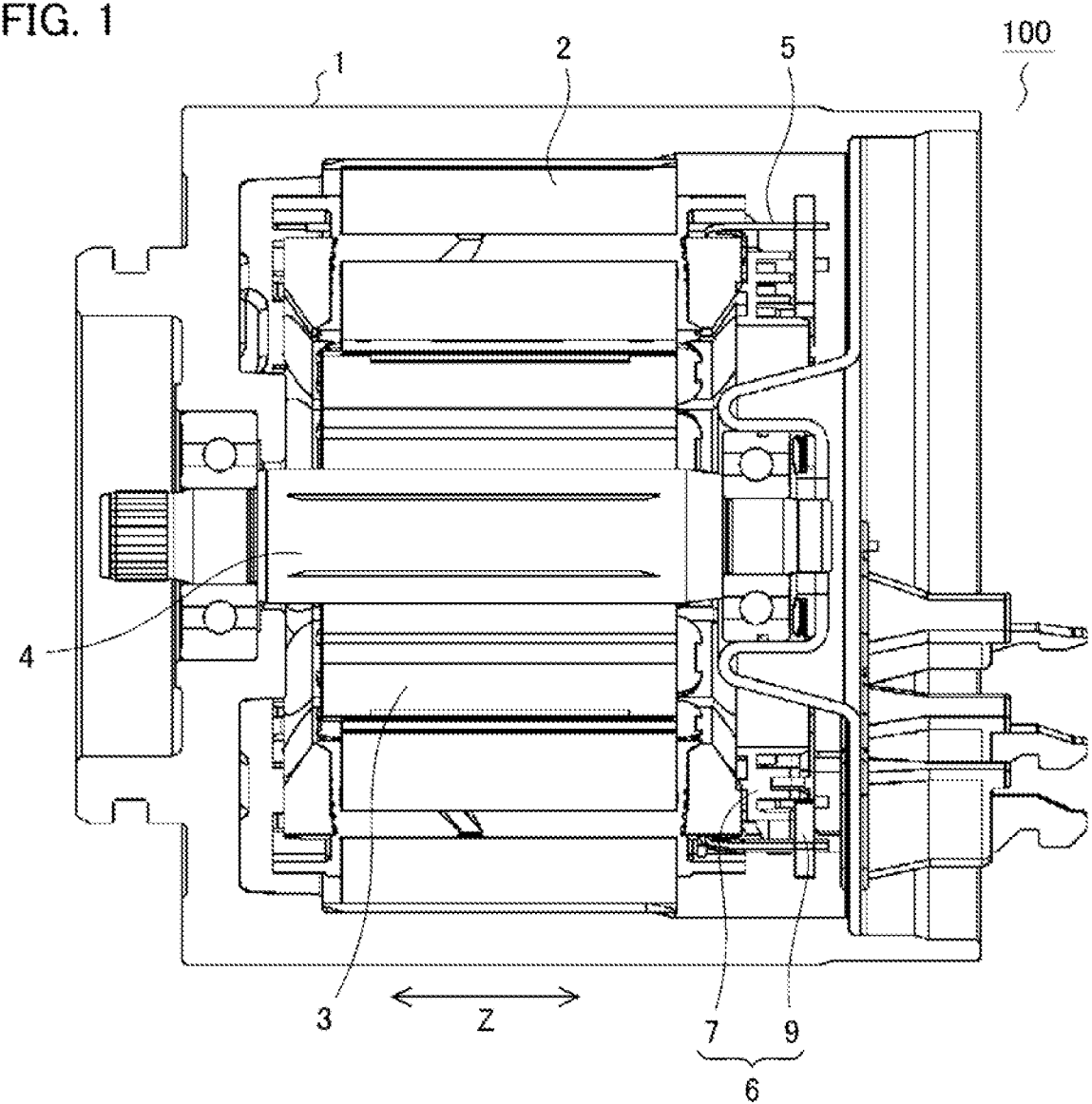
FIG. 1 is a sectional view showing a rotating electrical machine according to embodiment 1.
Figure 2:
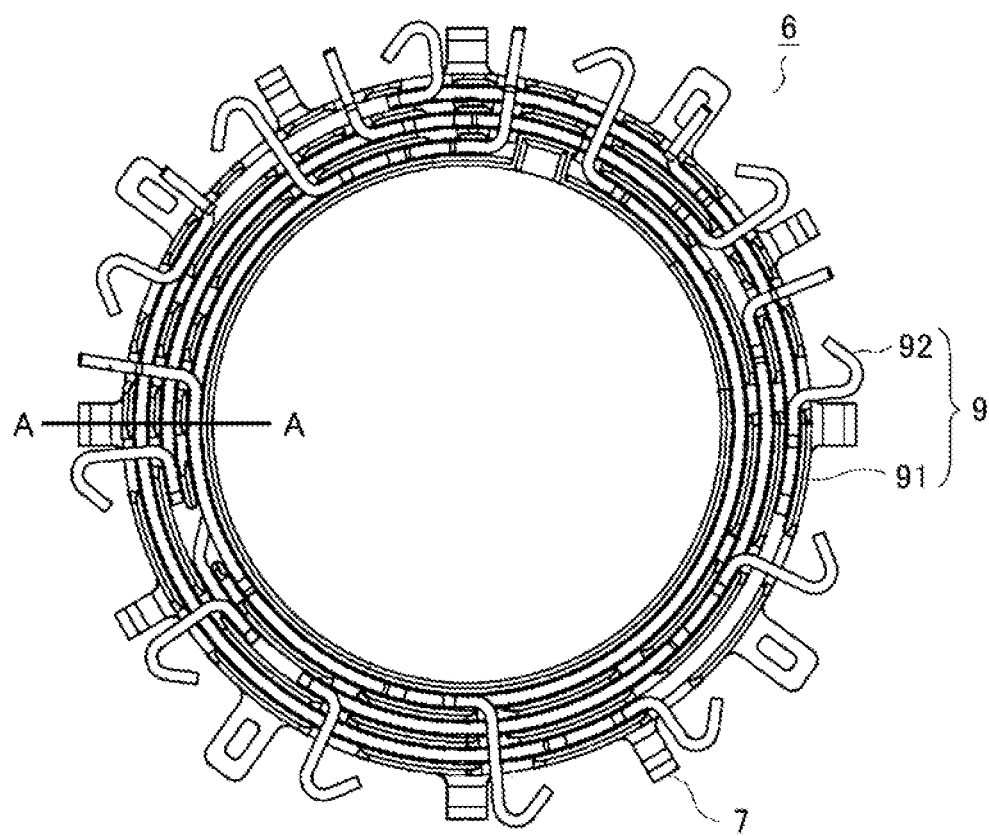
FIG. 2 is a top view showing a coil connection body of the rotating electrical machine according to embodiment 1.
Figure 3:
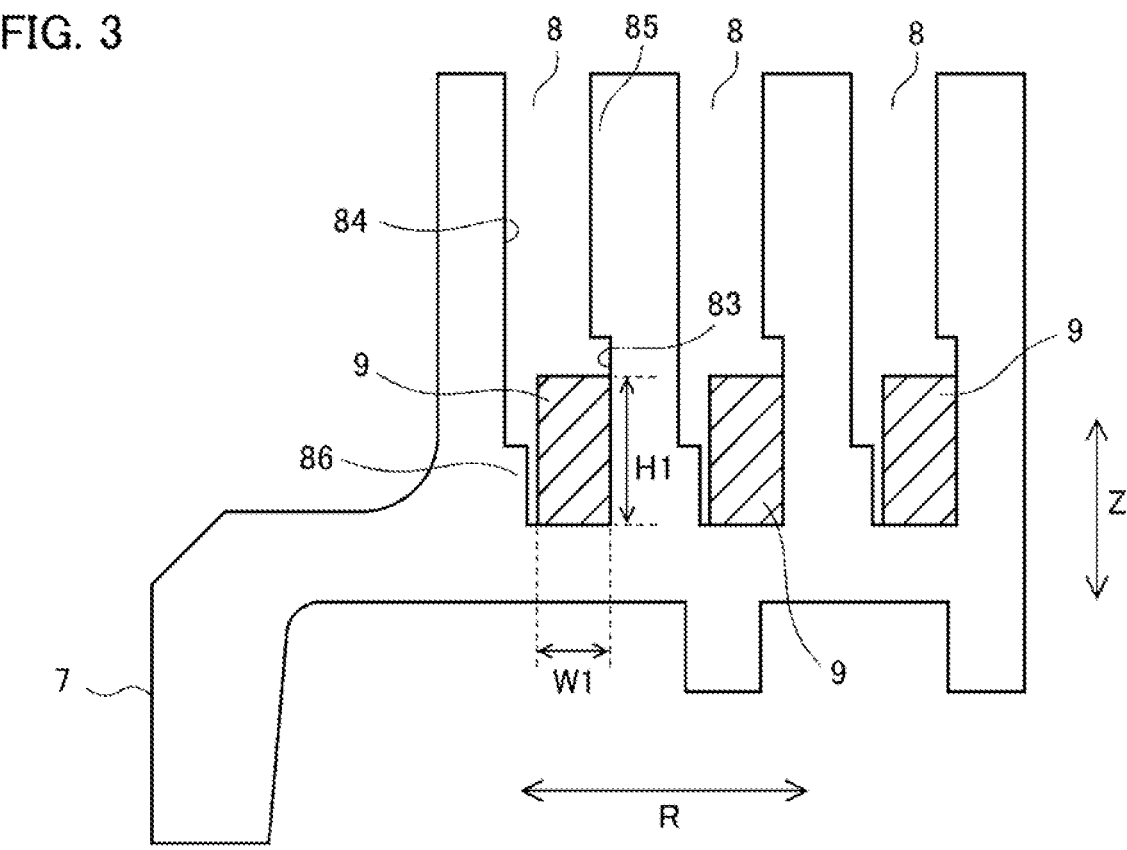
FIG. 3 is a partial sectional view showing the coil connection body according to embodiment 1.
Figure 4:
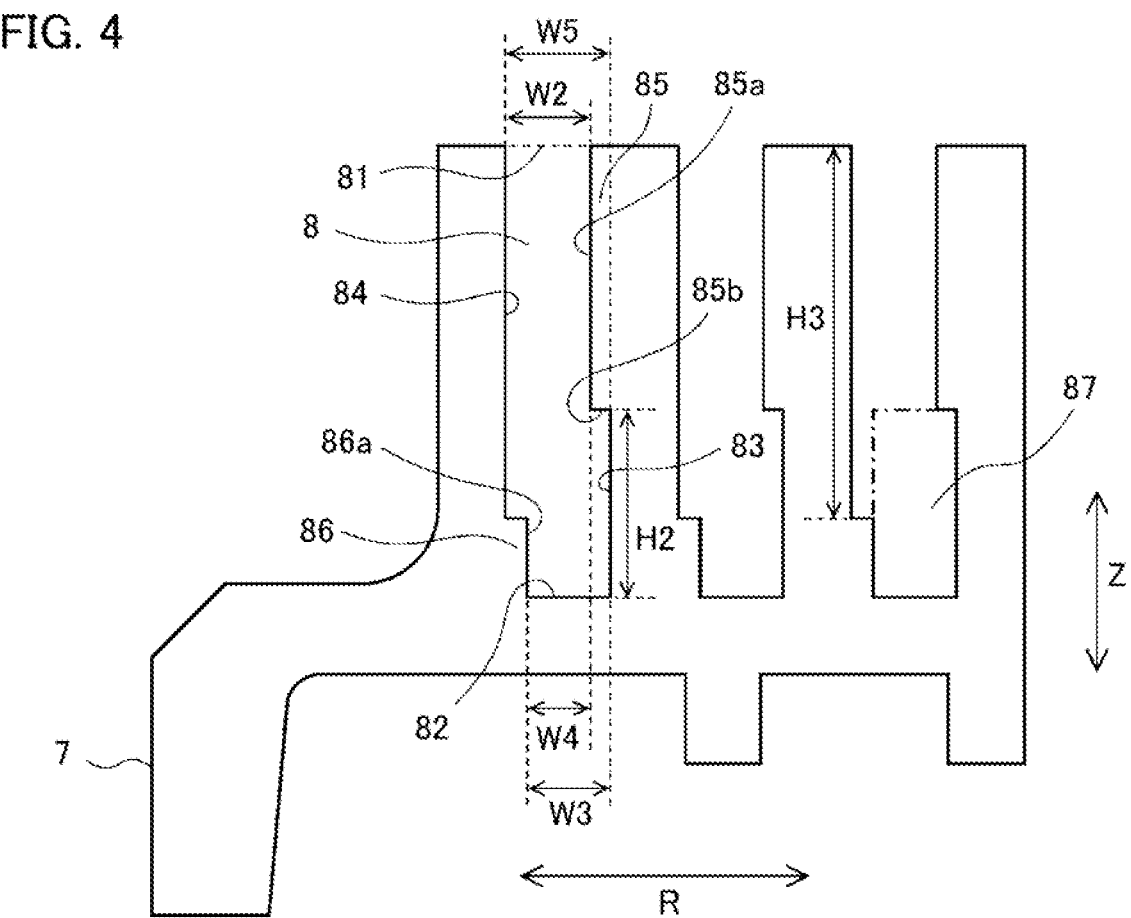
FIG. 4 is a partial sectional view showing a holder of the coil connection body according to embodiment 1.

Hereinafter, a rotating electrical machine according to embodiment 1 will be described with reference to the drawings. FIG. 1 is a sectional view showing a rotating electrical machine according to embodiment 1, FIG. 2 is a top view showing a coil connection body of the rotating electrical machine according to embodiment 1, and FIG. 3 is a sectional view of a part indicated by A-A in FIG. 2. FIG. 4 is a partial sectional view showing a holder of the coil connection body according to embodiment 1. In the drawings, the same or corresponding parts are denoted by the same reference characters. In the drawings, arrow Z indicates the axial direction of the rotating electrical machine, and arrow R indicates the radial direction of the rotating electrical machine.

A rotating electrical machine 100 according to embodiment 1 is used for an electric power steering driving motor or the like, and as shown in FIG. 1, a stator 2 is press-fitted and fixed to the inner circumference of a frame 1. A rotor 3 is rotatably provided on the inner circumferential side of the stator 2. The rotor 3 is fixed to a rotary shaft 4 inserted at the axial position, and has permanent magnets. However, the rotor 3 is not limited to a permanent magnet rotor, but may be a squirrel-cage rotor, a winding rotor, or the like.

The stator 2 includes a stator core formed by arranging, in an annular shape, a plurality of divided cores each formed by stacking electromagnetic steel sheets. Each divided core has an arc-shaped core back portion and a tooth protruding inward in the radial direction from the inner circumferential wall surface of the core back portion. Each divided core is provided with a bobbin which is an insulating member, and a coil 5 for U phase, V phase, or W phase is wound around the tooth with the bobbin therebetween. An end of the coil 5 is subjected to predetermined wire connection by an annular coil connection body 6 provided coaxially with the stator 2.

As shown in FIG. 2, the coil connection body 6 includes an insulating holder (hereinafter, holder 7) made of resin, and a power supply terminal (hereinafter, terminal 9) which is a conductive member to be connected to the end of the coil 5. The holder 7 has a plurality of grooves 8 arranged concentrically. The terminal 9 has an arc portion 91 held in the groove 8 of the holder 7, and a hook portion 92 provided on the upper side of the arc portion 91. The terminal 9 is held at a predetermined position in the groove 8 of the holder 7, and is connected to an end of the coil 5 wound around the tooth of the divided core.

The internal structure of the groove 8 formed in the holder 7 of the coil connection body 6, and the positional relationship thereof with the terminal 9, will be described in detail with reference to FIG. 3 and FIG. 4. In the drawings, H indicates the dimension in the axial direction, and W indicates the dimension in the radial direction. The holder 7 shown in FIG. 3 and FIG. 4 has three grooves 8 arranged concentrically, and the sectional shapes inside the grooves 8 are the same. Therefore, some of reference characters are omitted in the drawings.

As shown in FIG. 4, the groove 8 of the holder 7 has a groove opening 81 and a bottom portion 82 which are located at ends in the axial direction, and side walls 83, 84 opposed to each other in the radial direction. Each groove 8 has an overhang portion 85 provided on the groove opening 81 side relative to the terminal 9 on one of the side walls (here, side wall 83 on the inner circumferential side), and a positioning projection 86 provided at a position opposed in the radial direction to the terminal 9 on the other side wall (here, side wall 84 on the outer circumferential side). Although the overhang portion 85 is provided at the side wall 83 on the inner circumferential side and the positioning projection 86 is provided at the side wall 84 on the outer circumferential side in embodiment 1, these may be reversed from each other.

A terminal holding portion 87 corresponding to the predetermined position of the terminal 9 is a space surrounded by a dotted-dashed line shown in FIG. 4, a side surface 85b of the overhang portion 85, the one side wall 83, the bottom portion 82, and a top portion 86a of the positioning projection 86. The terminal 9 held at the terminal holding portion 87 is restricted from moving in the axial direction, by the overhang portion 85, and restricted from moving in the radial direction, by the positioning projection 86. That is, the overhang portion 85 prevents lifting and coming-off of the terminal 9, and the positioning projection 86 positions the terminal 9 such that a part of the terminal 9 overlaps the overhang portion 85 in the axial direction.

As shown in FIG. 3 and FIG. 4, the width dimension of the terminal 9 is denoted by W1, the height dimension of the terminal 9 is denoted by H1, the width dimension of the groove opening 81 is denoted by W2, the width dimension of the bottom portion 82 is denoted by W3, the interval between a top portion 85a of the overhang portion 85 and the top portion 86a of the positioning projection 86 is denoted by W4, and the interval between the side wall 83 and the side wall 84 is denoted by W5. In addition, the height dimension from the bottom portion 82 of the groove 8 to the side surface 85b of the overhang portion 85 is denoted by H2, and the height dimension from the groove opening 81 to the positioning projection 86 is denoted by H3.

The width dimension W2 of the groove opening 81 is set to be greater than the width dimension W1 of the terminal 9 so that the terminal 9 can be inserted (W2>W1). The width dimension W3 of the bottom portion 82 is set to be greater than the width dimension W1 of the terminal 9 so that the terminal 9 can be held (W3>W1). Similarly, the height dimension H2 from the bottom portion 82 to the side surface of the overhang portion 85 is set to be greater than the height dimension H1 of the terminal 9 so that the terminal 9 can be held (H2>H1). It is noted that the greater the values of W2, W3, and H2 are, the greater the device size is. Therefore, it is desirable that these values are set to be smaller within a range that allows insertion and holding of the terminal 9.

The height dimension H3 from the groove opening 81 to the positioning projection 86 is set to such a height that the terminal 9 can be inserted to the terminal holding portion 87 and insulation property of the terminal 9 can be ensured. If H3 is great, the device size becomes large, whereas if H3 is small, it becomes difficult to ensure insulation property of the terminal 9. Therefore, it is desirable that H3 is set to be smaller within a range that can ensure insulation property.

In embodiment 1, the axial-direction sectional shapes of the overhang portion 85 and the positioning projection 86 are rectangular. In this case, the interval W4 between the top portions 85a, 86a of the overhang portion 85 and the positioning projection 86 is set to be smaller than the width dimension W1 of the terminal 9 (W4<W1). Thus, when the terminal 9 moves in a direction from the terminal holding portion 87 toward the groove opening 81, the terminal 9 comes into contact with the side surface 85b of the overhang portion 85, whereby lifting and coming-off of the terminal 9 can be prevented.

The sectional shapes of the overhang portion 85 and the positioning projection 86 are not limited to rectangular shapes. In the case where the sectional shapes of the overhang portion 85 and the positioning projection 86 are shapes other than rectangular shapes (see FIG. 5), an interval W4' between the most protruding parts in the radial direction of the overhang portion 85 and the positioning projection 86 is set to be smaller than the width dimension W1 of the terminal 9 (W4'<W1).

The overhang portion 85 and the positioning projection 86 may be provided over the entire circumference of the groove 8, or may be partially provided. In the case where the overhang portion 85 and the positioning projection 86 are partially provided, the radial-direction dimension of the groove opening at a part where the overhang portion 85 and the positioning projection 86 are not provided is W5 (W5>W2), so that the terminal 9 can be easily inserted in attachment work.

In a conventional coil connection body as a comparative example for the coil connection body according to embodiment 1, a projection provided in the groove ensures contact between the holder and the terminal and thus prevents lifting and coming-off of the terminal. In the case of such a structure, if the width dimension of the groove is smaller than a design value, it is necessary to increase a load in attachment work, so that assemblability is deteriorated, and if the width dimension of the groove is greater than the design value, contact between the holder and the terminal cannot be ensured. Therefore, high dimensional accuracy is required for the holder.

On the other hand, in the coil connection body 6 according to embodiment 1, it is only required that the terminal 9 comes into contact with the side surface 85b of the overhang portion 85 when the terminal 9 moves in a direction toward the groove opening 81. That is, it is not necessary that the terminal 9 held at the terminal holding portion 87 is constantly in contact with the overhang portion and the positioning projection 86. Therefore, it is not necessary to strictly set the dimensional tolerance between the groove 8 and the terminal 9. In addition, high dimensional accuracy is not required for the holder 7, so that manufacturing becomes easy. Further, a large load is not needed in attachment work, and thus assemblability is excellent.

In the rotating electrical machine 100 according to embodiment 1, the overhang portion 85 for restricting axial-direction movement of the terminal 9 and the positioning projection 86 for restricting radial-direction movement of the terminal 9 are provided in the groove 8 formed in the holder 7 of the coil connection body 6. Thus, with a simple structure, lifting and coming-off of the terminal 9 can be inhibited, whereby insulation property between the terminals 9 is improved.

In addition, since attachment of the terminal 9 to the holder 7 can be performed by insertion, assembly equipment is simplified and thus equipment cost is reduced. Further, since lifting of the terminal 9 is inhibited, productivity in the later process for connecting the terminal 9 and an end of the coil 5 is improved. From the above, according to embodiment 1, the rotating electrical machine 100 that is high in assemblability and insulation property is obtained.

Embodiment 2

Figure 5:
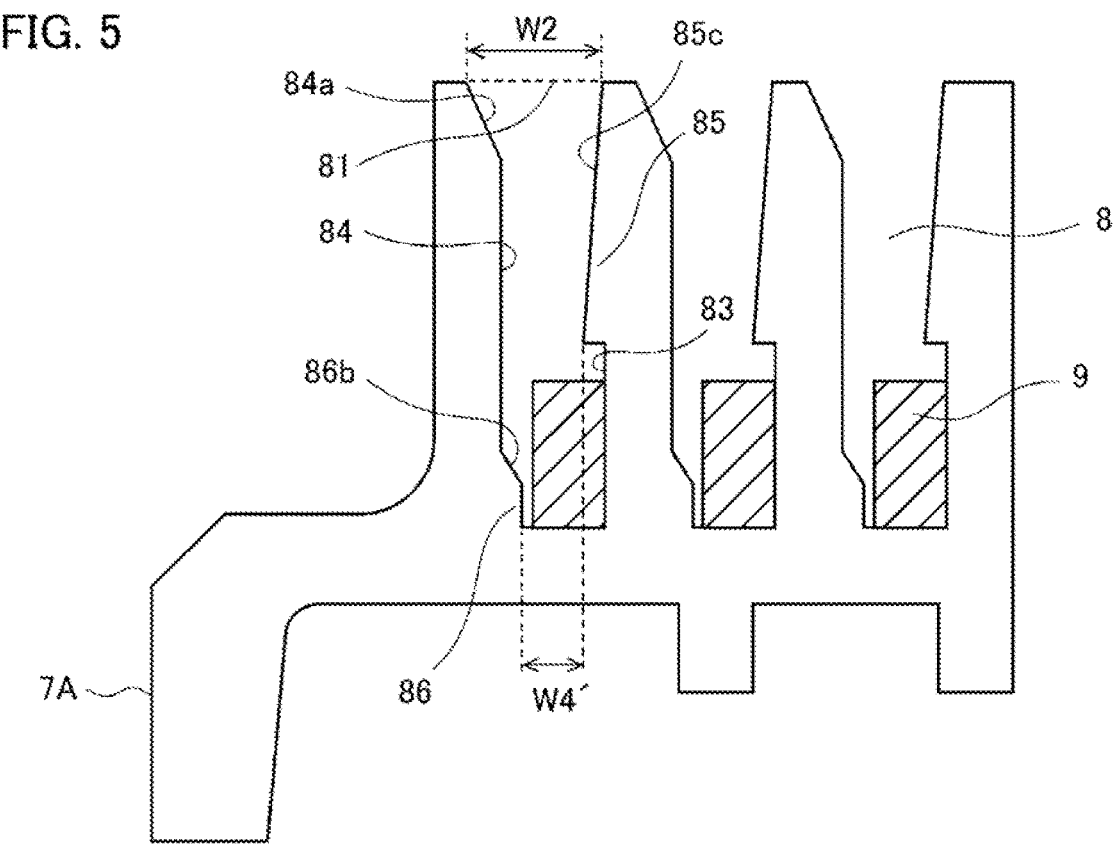
FIG. 5 is a partial sectional view showing a coil connection body according to embodiment 2.
Figure 6:
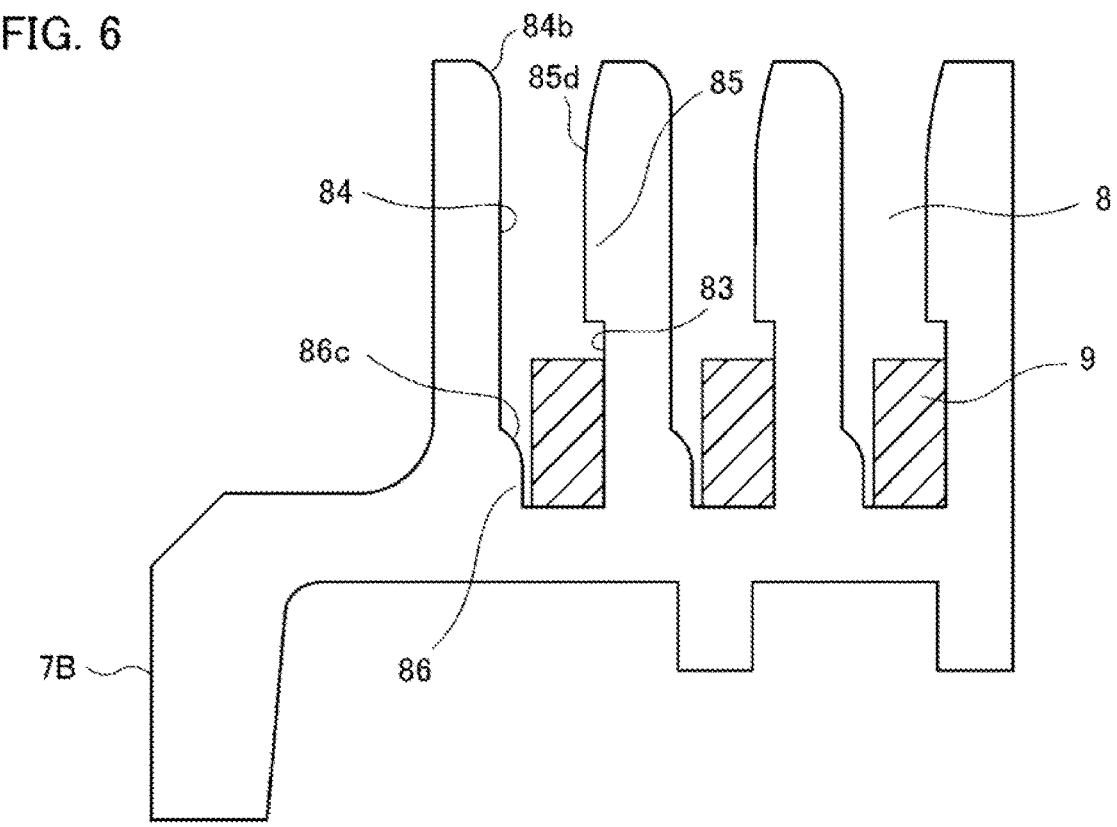
FIG. 6 is a partial sectional view showing another coil connection body according to embodiment 2.
Figure 7:
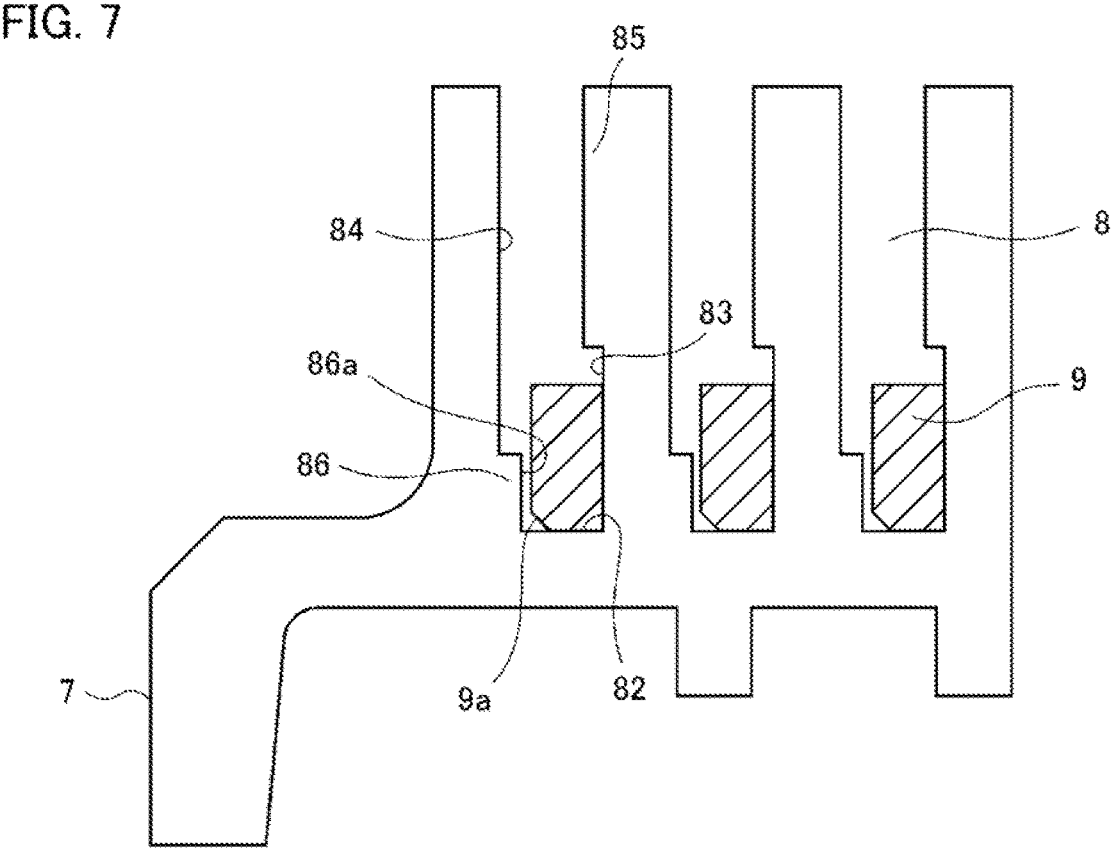
FIG. 7 is a partial sectional view showing still another coil connection body according to embodiment 2.

In embodiment 2, a modification of the holder of the coil connection body or the terminal will be described. FIG. 5 to FIG. 7 are partial sectional views showing the coil connection body according to embodiment 2. Holders 7A, 7B, 7 shown in FIG. 5 to FIG. 7 each have three grooves 8 arranged concentrically, and the sectional shapes inside the grooves 8 are the same. Therefore, some of reference characters are omitted in the drawings. In addition, the entire structure of the rotating electrical machine according to embodiment 2 is the same as in the above embodiment 1, and therefore the description thereof is omitted here.

The holder 7A shown in FIG. 5 has a slope portion 85c for expanding the width dimension W2 of the groove opening 81, on the overhang portion 85 provided on the one side wall 83. In addition, the holder 7A has a slope portion 84a for expanding the width dimension W2 of the groove opening 81, on the other side wall 84. With this structure, a partition portion between the adjacent grooves 8 of the holder 7A has a taper shape tapered toward the distal end. Further, the holder 7A has a slope portion 86b at a corner on the groove opening 81 side of the positioning projection 86.

The holder 7B shown in FIG. 6 has a curved surface portion 85d for expanding the width dimension W2 of the groove opening 81, on the overhang portion 85 provided on the one side wall 83. In addition, the holder 7B has a curved surface portion 84b for expanding the width dimension W2 of the groove opening 81, on the other side wall 84. Further, the holder 7B has a curved surface portion 86c at a corner on the groove opening 81 side of the positioning projection 86.

As described above, the slope portion 84a or the curved surface portion 84b is formed on the side wall 84, and the slope portion 85c or the curved surface portion 85d is formed on the groove opening 81 side of the overhang portion 85, so as to expand the width dimension W2 of the groove opening 81. Thus, attachment of the terminal 9 becomes easy. In the examples shown in FIG. 5 and FIG. 6, the slope portion or the curved surface portion is formed on both of the side wall 84 and the overhang portion 85, but may be formed on one of the side wall 84 and the overhang portion 85.

The terminal 9 shown in FIG. 7 has a slope portion 9a at a corner opposed to the positioning projection 86 and the bottom portion 82 of the groove 8. Instead of the slope portion 9a, a curved surface portion may be provided. Such a configuration also makes it easy to attach the terminal 9. In addition, a configuration in which the terminal 9 shown in FIG. 7 is combined with the holder 7A (7B) shown in FIG. 5 (or FIG. 6) may be adopted, whereby attachment of the terminal 9 becomes easier. According to embodiment 2, the same effects as in the above embodiment 1 are provided and in addition, attachment of the terminal 9 to the holder 7 becomes easy and thus assemblability is further improved.

Embodiment 3

Figure 8:
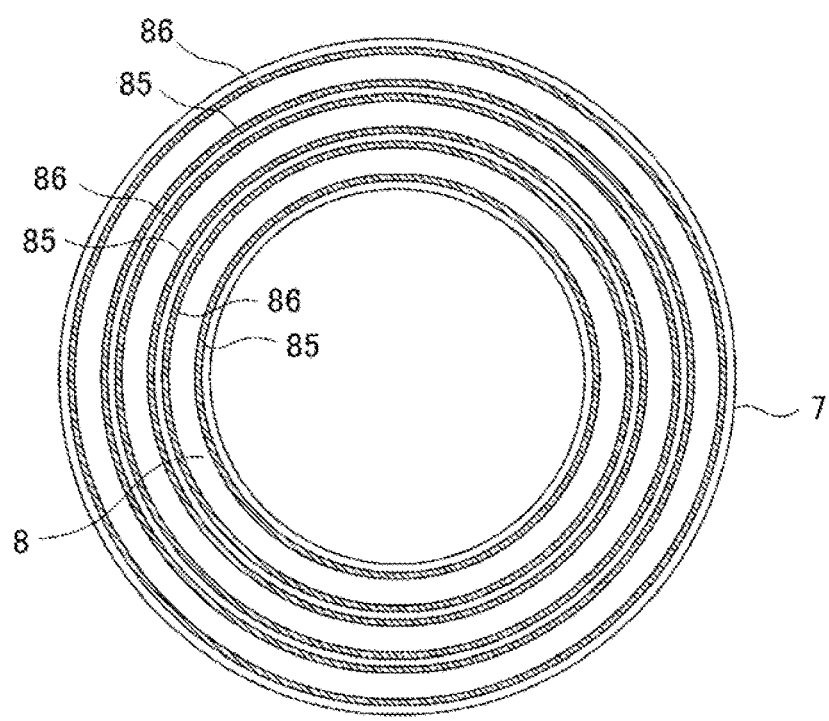
FIG. 8 is a top view showing an arrangement example of overhang portions and positioning projections in a coil connection body according to embodiment 3.
Figure 9:
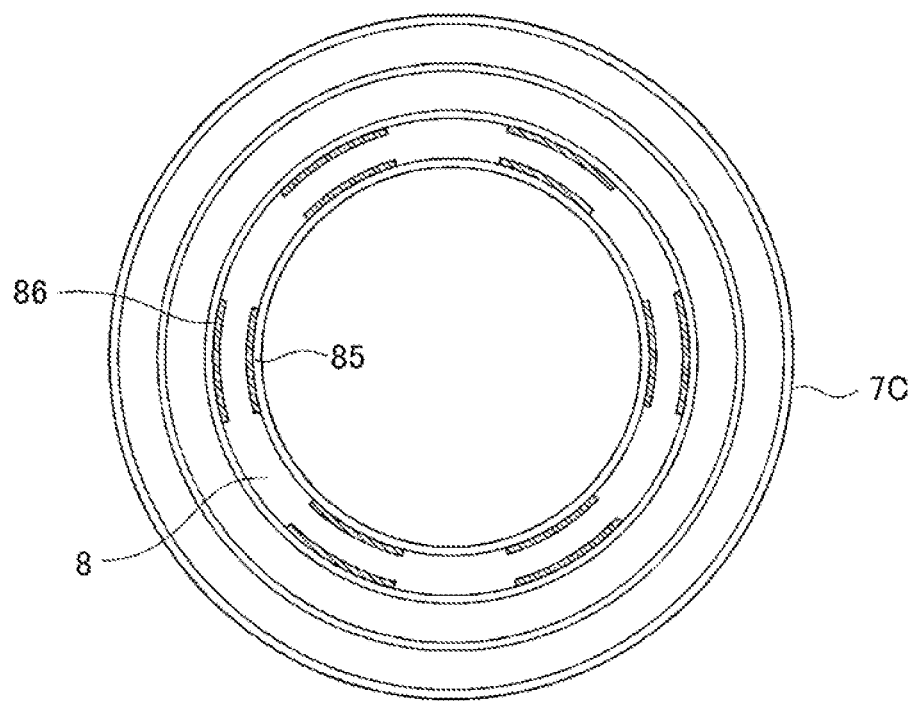
FIG. 9 is a top view showing another arrangement example of overhang portions and positioning projections in the coil connection body according to embodiment 3.
Figure 10:
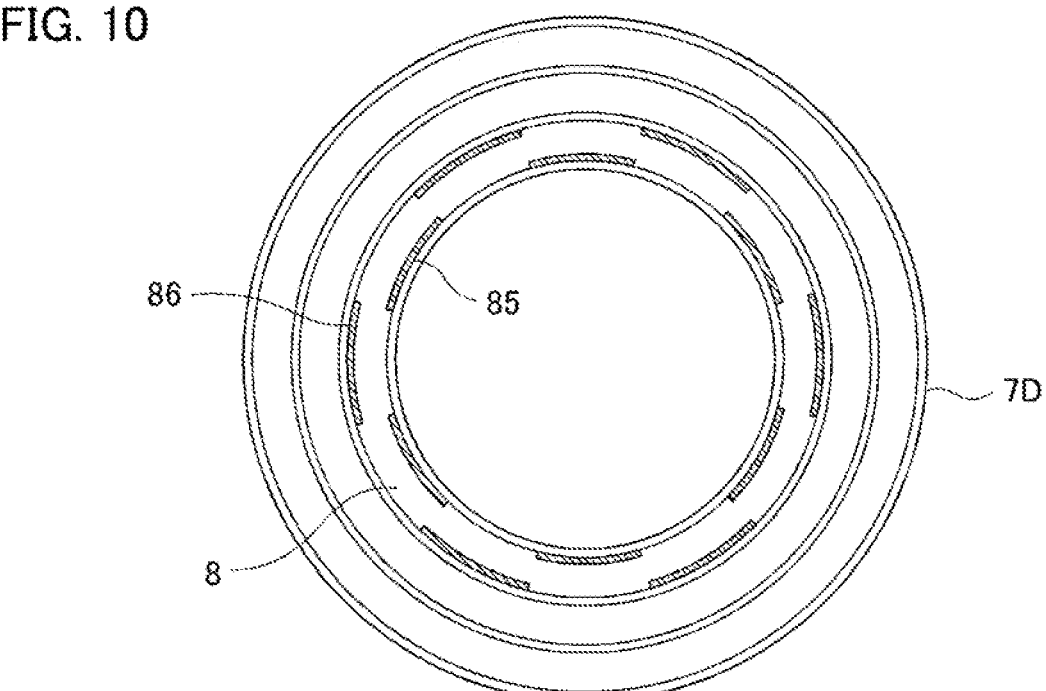
FIG. 10 is a top view showing still another arrangement example of overhang portions and positioning projections in the coil connection body according to embodiment 3.

In embodiment 3, arrangement examples of the overhang portions and the positioning projections in the holder of the coil connection body will be described. FIG. 8 to FIG. 10 are top views showing arrangement examples of the overhang portions and the positioning projections in the coil connection body according to embodiment 3. In FIG. 9 and FIG. 10, the overhang portions 85 and the positioning projections 86 are shown in only the groove 8 on the innermost circumference, but the same structure applies also to the other grooves 8. The entire structure of the rotating electrical machine according to embodiment 3 is the same as in the above embodiment 1, and therefore the description thereof is omitted here.

In the arrangement example shown in FIG. 8, the overhang portion 85 and the positioning projection 86 are provided over the entire circumference of each groove 8. The holder 7 configured as described above can assuredly inhibit lifting of the terminal 9, thus obtaining high holding property. Meanwhile, the contact area with the terminal 9 in attachment work becomes large.

In the arrangement examples shown in FIG. 9 and FIG. 10, the overhang portions 85 and the positioning projections 86 are partially provided at intervals in the circumferential direction in each groove 8 of holders 7C, 7D. In the holder 7C shown in FIG. 9, the overhang portions 85 and the positioning projections 86 are arranged so as to overlap each other in the radial direction, and in the holder 7D shown in FIG. 10, the overhang portions 85 and the positioning projections 86 are arranged alternately so as not to overlap each other in the radial direction.

As described above, although high holding property is obtained when the overhang portion 85 and the positioning projection 86 are provided over the entire circumference of the groove 8, intermittent arrangement (FIG. 9) or alternate arrangement (FIG. 10) with intervals provided in the circumferential direction may be adopted. In the case of the holders 7C, 7D in which the overhang portions 85 and the positioning projections 86 are partially provided, the contact area with the terminal 9 becomes small as compared to the holder 7 in which the overhang portion 85 and the positioning projection 86 are provided over the entire circumference, and thus assemblability is improved.

In general, a plurality of terminals 9 are attached in the groove 8 of one holder. Then, the overhang portion 85 and the positioning projection 86 need to be provided in at least one location in a zone where the arc portion 91 of the terminal 9 is provided. However, in the case where the length dimension in the circumferential direction of the overhang portion 85 is small, holding property for the terminal 9 is low, so that the terminal 9 might be lifted at a location away from the overhang portion 85. Therefore, in the case where the length dimension in the circumferential direction of the overhang portion 85 is small, it is desirable to provide one overhang portion 85 at each of vicinities of both ends in the zone where the terminal 9 is provided.

The arrangement of the overhang portion 85 and the positioning projection 86 is not limited to the examples shown in FIG. 8 to FIG. 10, but may be modified in various manners. In addition, the overhang portion 85 and the positioning projection 86 need not be equal to each other in the length dimension in the circumferential direction and in the width dimension in the radial direction, and also, the intervals in their intermittent arrangements need not be equal pitches. According to embodiment 3, the same effects as in the above embodiment 1 are provided and in addition, owing to the partial arrangements of the overhang portions 85 and the positioning projections 86, assemblability is improved and lifting and coming-off of the terminal 9 can be efficiently inhibited.

Embodiment 4

Figure 11:
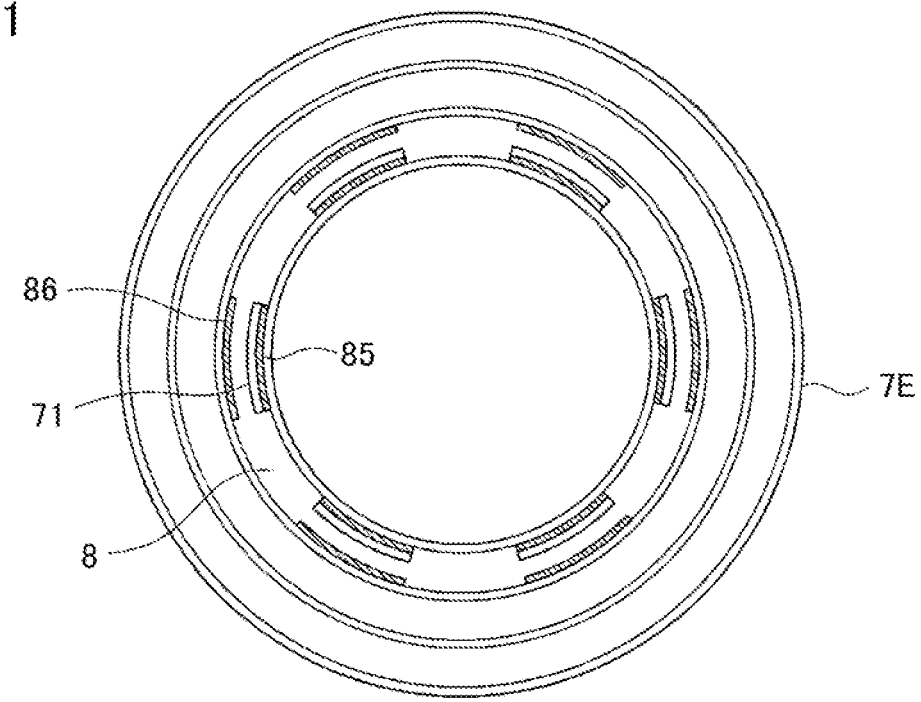
FIG. 11 is a top view showing a holder in a coil connection body according to embodiment 4.
Figure 12:
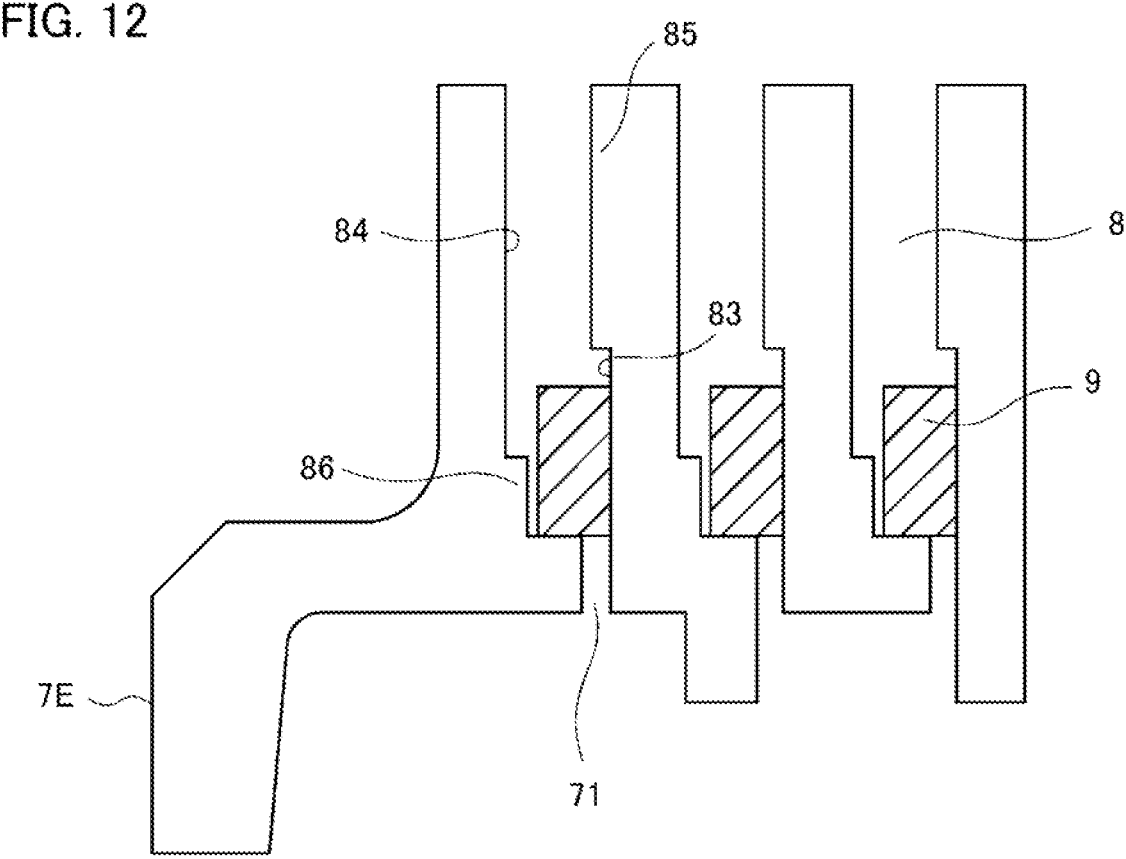
FIG. 12 is a partial sectional view showing the coil connection body according to embodiment 4.

In embodiment 4, a modification of the holder of the coil connection body will be described. FIG. 11 is a top view showing the holder in the coil connection body according to embodiment 4, and FIG. 12 is a partial sectional view showing the coil connection body according to embodiment 4. The entire structure of the rotating electrical machine according to embodiment 4 is the same as in the above embodiment 1, and therefore the description thereof is omitted here.

In general, in the manufacturing process for a holder made of resin, molding work is performed through uniaxial up-down operation using an upper mold for forming groove shapes and the like and a lower mold for forming the back surface. In such molding work, it is difficult to mold the overhang portion 85 which is an undercut, and a special working process is needed therefor. Therefore, a holder 7E according to embodiment 4 has a through hole 71 in the bottom portion 82 of the groove 8 which is opposed to the overhang portion 85, thus making it easy to mold the overhang portion 85.

In embodiment 4, a lower mold used in molding work for the holder 7E has a mold part (i.e., pin) that can pass through the through hole 71 and reach the overhang portion 85. At the time of molding work for the holder 7E, the pin of the lower mold is extended to the inside of the groove 8 from the position of the through hole 71 and fixed at the position of the side surface 85b of the overhang portion 85, and in this state, resin is cured. Thus, the holder 7E having the overhang portion 85 and the through hole 71 is formed. It is noted that the size of the through hole 71 should be as small as possible in view of ensuring stiffness of the holder 7E, and it is desirable that the size of the through hole 71 is approximately equal to the size of the overhang portion 85.

According to embodiment 4, the same effects as in the above embodiment 1 are provided and in addition, the overhang portion 85 can be formed by conventional molding work only, without the need of a special working process, whereby the manufacturing process can be simplified. The manufacturing method for the holder having the overhang portion 85 is not limited to the method described in embodiment 4. As another method, the holder having the overhang portion 85 can be manufactured using biaxial operation in the up-down direction and the circumferential direction for operation of a mold, or by molding using a 3D printer.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 frame
2 stator
3 rotor
4 rotary shaft 5 coil
6 coil connection body
7, 7A, 7B, 7C, 7D, 7E holder
8 groove
9 terminal
9a slope portion
71 through hole
81 groove opening
82 bottom portion
83 side wall
84 side wall
84a slope portion
84b curved surface portion
85 overhang portion
85a top portion
85b side surface
85c slope portion
85d curved surface portion
86 positioning projection
86a top portion
86b slope portion
86c curved surface portion
87 terminal holding portion
91 arc portion
92 hook portion
100 rotating electrical machine

The invention claimed is:

1. A rotating electrical machine comprising an annular coil connection body provided coaxially with a stator, wherein
the annular coil connection body includes an insulating holder made of resin and having a plurality of grooves provided coaxially, and a conductive member held in each groove of the plurality of grooves and connected to an end of a coil wound around a tooth of the stator, and
each groove of the plurality of grooves has an overhang portion provided at a groove opening side relative to the conductive member on one side wall and restricting an axial-direction movement of the conductive member, and a positioning projection provided at a position opposed in a radial direction to the conductive member on another side wall, and restricting a radial-direction movement of the conductive member,
wherein the conductive member has a slope portion or a curved surface portion at a corner thereof opposed to the positioning projection and a bottom portion of each groove of the plurality of grooves.

2. The rotating electrical machine according to claim 1, wherein
the positioning projection positions the conductive member such that a part of the conductive member overlaps the overhang portion in an axial direction.

3. The rotating electrical machine according to claim 2, wherein
an interval between most protruding parts in the radial direction of the overhang portion and the positioning projection is smaller than a width dimension in the radial direction of the conductive member.

4. The rotating electrical machine according to claim 2, wherein
the other side wall has a slope portion or a curved surface portion for expanding a width of the groove opening.

5. The rotating electrical machine according to claim 2, wherein
the overhang portion has a slope portion or a curved surface portion for expanding a width of the groove opening.

6. The rotating electrical machine according to claim 2, wherein
the positioning projection has a slope portion or a curved surface portion at a corner thereof on the groove opening side.

7. The rotating electrical machine according to claim 2, wherein
each groove of the plurality of grooves has a through hole in a bottom portion thereof opposed to the overhang portion.

8. The rotating electrical machine according to claim 1, wherein
a width dimension in the radial direction of the groove opening is greater than a width dimension in the radial direction of the conductive member.

9. The rotating electrical machine according to claim 1, wherein
an interval between most protruding parts in the radial direction of the overhang portion and the positioning projection is smaller than a width dimension in the radial direction of the conductive member.

10. The rotating electrical machine according to claim 9, wherein
the other side wall has a slope portion or a curved surface portion for expanding a width of the groove opening.

11. The rotating electrical machine according to claim 9, wherein
the overhang portion has a slope portion or a curved surface portion for expanding a width of the groove opening.

12. The rotating electrical machine according to claim 1, wherein
the overhang portion and the positioning projection are provided over an entire circumference of each groove of the plurality of grooves.

13. The rotating electrical machine according to claim 1, wherein
the overhang portion and the positioning projection are partially provided at intervals in a circumferential direction in each groove of the plurality of grooves, and placed so as to overlap each other in the radial direction.

14. The rotating electrical machine according to claim 1, wherein
the overhang portion and the positioning projection are partially provided at intervals in a circumferential direction in each groove of the plurality of grooves, and placed so as not to overlap each other in the radial direction.

15. The rotating electrical machine according to claim 1, wherein
the other side wall has a slope portion or a curved surface portion for expanding a width of the groove opening.

16. The rotating electrical machine according to claim 1, wherein
the overhang portion has a slope portion or a curved surface portion for expanding a width of the groove opening.

17. The rotating electrical machine according to claim 1, wherein
the positioning projection has a slope portion or a curved surface portion at a corner thereof on the groove opening side.

18. The rotating electrical machine according to claim 1, wherein
each groove of the plurality of grooves has a through hole in a bottom portion thereof opposed to the overhang portion.

\* \* \* \* \*